(No Model.)

E. CHURCH.
BICYCLE REST.

No. 589,464. Patented Sept. 7, 1897.

WITNESSES:
Donn Twitchell
Fred Acker

INVENTOR
E. Church.
BY
Munn
ATTORNEYS.

THE NORRIS PETERS CO., PHOTO-LITHO., WASHINGTON, D. C.

UNITED STATES PATENT OFFICE.

EUGENE CHURCH, OF TACOMA, WASHINGTON, ASSIGNOR TO THE INTERNATIONAL NOVELTY COMPANY, OF SAME PLACE.

BICYCLE-REST.

SPECIFICATION forming part of Letters Patent No. 589,464, dated September 7, 1897.

Application filed November 28, 1896. Serial No. 613,721. (No model.)

*To all whom it may concern:*

Be it known that I, EUGENE CHURCH, of Tacoma, in the county of Pierce and State of Washington, have invented a new and Improved Bicycle-Rest, of which the following is a full, clear, and exact description.

The object of my invention is to provide a rest for a bicycle especially adapted for use in cleaning a bicycle or holding the machine from the ground.

A further object of the invention is to provide a rest for a bicycle which will be simple, durable, and economic and which when not in use will occupy a very small space and which may also be quickly and conveniently secured to the bicycle when required.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
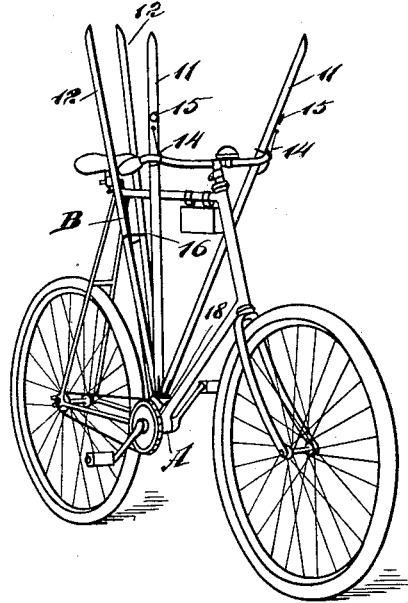
Figure 3:
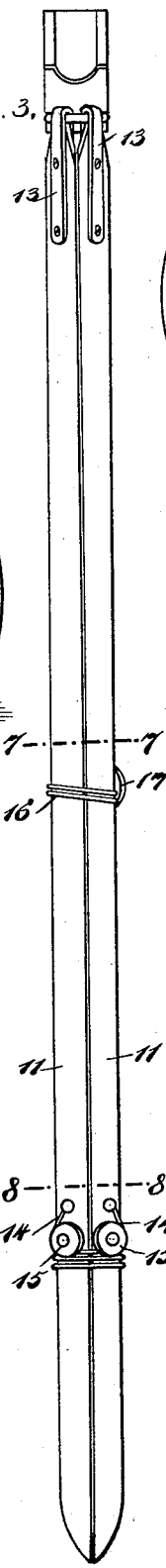
Figure 2:
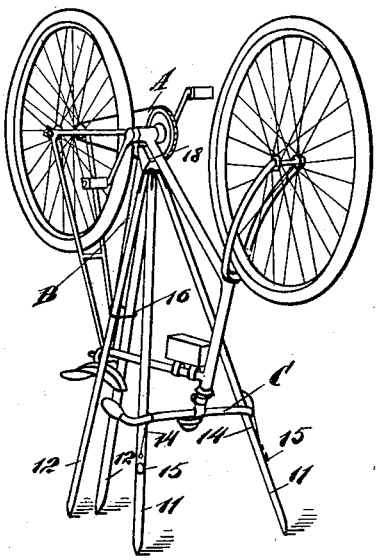
Figure 4:
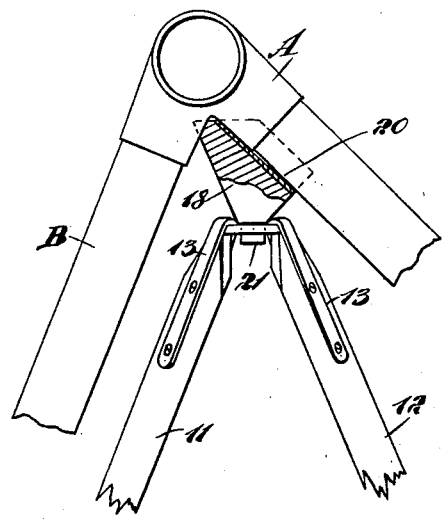
Figure 5:
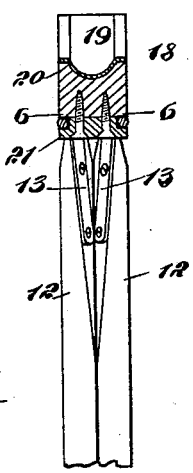
Figure 6:
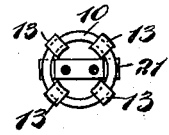
Figure 7:
Figure 8:

Figure 1 is a perspective view of a bicycle in its ordinary position and likewise a perspective view of the device applied to the machine. Fig. 2 is a perspective view of the bicycle and the device for supporting the same, the bicycle being shown as held at an elevation. Fig. 3 is a side elevation of the device, drawn on an enlarged scale and illustrated as folded. Fig. 4 is an enlarged view of the upper portion of the device and a portion of the bicycle-frame supported by the same, the rest-block being in section. Fig. 5 is a side elevation of the upper portion of the device, the rest-block and the cross-bar supporting the same, together with the head of the device, being in section. Fig. 6 is a section taken substantially on the line 6 6 of Fig. 5. Fig. 7 is a section taken substantially on the line 7 7 of Fig. 3, and Fig. 8 is a section taken substantially on the line 8 8 of Fig. 3.

In carrying out the invention a ring-like head 10 is provided, as is shown particularly in Fig. 6, and ordinarily four legs are connected with the said head, the two front legs being designated as 11 and the two rear legs as 12. These legs may be of any suitable length and are substantially triangular in cross-section, their outer surfaces being usually convexed. In fact, the four legs are so formed that when closed together in cross-section they will have a circular contour, as illustrated in Figs. 7 and 8. The upper end of each of the legs 11 and 12 is usually more or less pointed, and a strap 13 or its equivalent is attached to the upper end portion of each leg, the said straps being carried over the ring-like head 10 in a manner to form a hinge connection between the said head and said legs.

At a point near the lower end of each front leg 11, as illustrated in Fig. 3, a cord 14 is secured in any suitable or approved manner at one of its ends, and a fastening disk or keeper 15 is attached to each of the front legs 11 below the point of attachment of the cords, between which keepers and the outer surfaces of the legs the cords may be carried and held stationary or against slipping. Upon one of the rear legs 12 a cord 16 is attached, and a keeper 17 is provided for this cord, the said cord 16 and keeper 17 being located above the cords 14 and their keepers 15.

A rest-block 18 is fitted in the head 10. This rest-block is provided with an inclined groove or channel 19 in its upper face, the groove or channel having preferably a lining of felt, leather, or other soft material designated as 20. The rest-block 18 is made more or less tapering at its lower end, although it may be otherwise formed, and a cross-bar 21 is secured by screws or like devices to the head-block, as shown in Fig. 5, the said cross-bar having recesses in its upper face, as shown in Figs. 5 and 6, to receive the head 10. Therefore a portion of the cross-bar extends upward within the said head.

When the device is not in use, the legs are brought together and held in such position by winding the cords 14 and 16 around the legs and securing the cords by means of the keepers 15 and 17. When the device is required, the channeled surface 19 of the restblock is brought to an engagement with the frame of the bicycle just above the crankhanger A. The front legs 11 of the device are carried one in direction of each end of the handle-bar of the machine and attached to the handle-bar through the medium of the cords 14 and their keepers, while the rear legs are carried upward and rearward, one at each side of the saddle, as shown in Fig. 1, and the upper cord 16 is employed to secure the rear legs to the center brace B of the bicycle-frame.

The attachment of the device to the bicycle having thus been made, the bicycle is upturned and reversed, and the device will rest upon the floor or other support in like manner as a tripod, the machine-frame resting on the block 18. A machine thus supported in an elevated position may be thoroughly cleaned in each and every part conveniently and expeditiously, or various parts of the machine may be fitted together, or the frame or parts of the machine may be readily repaired.

Having thus described my invention, I claim as new and desire to secure by Letters Patent—

1. A bicycle-support consisting of a stand and a rest-block connected to the upper end of said stand, the said block having an acute-angled ridge or corner at its free or upper end so as to be capable of receiving and supporting an inverted bicycle at the junction of the frame proper with the crank-hanger; substantially as described.

2. A bicycle-support consisting of a stand and a rest-block connected to the upper end of said stand, the rest-block having two converging or meeting inclined channels or seats in its free or upper face so as to be capable of receiving and supporting an inverted bicycle at the junction of the frame proper with the crank-hanger, substantially as described.

3. A support for bicycles, consisting of a head, legs having a hinged connection with the said head, the said legs being substantially triangular in cross-section, a rest-block attached to the head, provided with an inclined channel in its upper face, keepers secured to the forward legs near their lower ends, tying devices attached to the said forward legs, being adapted for engagement with the keeper and to be passed around the handle-bar of the bicycle, a second tying device and keeper being secured to one of the rear legs, the second tying device being arranged to pass around one of the braces of the bicycle-frame, as and for the purpose specified.

4. In a support for bicycles, the combination, with a rest-block provided with an inclined channel in its upper face, of legs having a hinged connection with the rest-block, the said legs being arranged to fold closely together, and keepers and tying devices attached to sundry of the said legs, as and for the purpose set forth.

5. In a support for bicycles, the combination, with a rest-block provided with an inclined channel in its upper face, a ring-like head, and a cross-bar recessed to receive the said head, the cross-bar being attached to the rest-block, of legs shaped to fit closely together, hinges connecting the said legs with the said head, and keepers and tying devices secured to sundry of the said legs at their exterior, as and for the purpose set forth.

EUGENE CHURCH.

Witnesses:
W. P. PRICHARD,
A. G. PRICHARD.